US008763455B1

(12) United States Patent
Chang (10) Patent No.: US 8,763,455 B1
(45) Date of Patent: Jul. 1, 2014

(54) RESISTIVE LIQUID LEVEL/TEMPERATURE SENSOR AND TRANSMITTER

(71) Applicant: Ken Chang, Cerritos, CA (US)

(72) Inventor: Ken Chang, Cerritos, CA (US)

(73) Assignee: OleumTech Corporation, Irvine, CA (US)

( * ) Notice: Subject to any disclaimer, the term of this patent is extended or adjusted under 35 U.S.C. 154(b) by 0 days.

(21) Appl. No.: 14/020,338

(22) Filed: Sep. 6, 2013

(51) Int. Cl.
G01F 23/72 (2006.01)
G01F 23/24 (2006.01)

(52) U.S. Cl.
USPC ................ 73/311; 73/304 R; 73/305; 73/314

(58) Field of Classification Search
USPC ........ 73/290 B, 290 R, 290 V, 305, 311, 313, 73/314, 319
See application file for complete search history.

(56) References Cited

U.S. PATENT DOCUMENTS

| 3,359,798 | A | * | 12/1967 | Katselis ........................... 73/308 |
| 3,935,741 | A | * | 2/1976 | Zinsmeyer et al. ............. 73/313 |
| 4,084,436 | A | * | 4/1978 | Smitherman .................... 73/313 |
| 4,361,835 | A | * | 11/1982 | Nagy ............................. 340/624 |
| 4,589,282 | A | * | 5/1986 | Dumery .......................... 73/313 |
| 4,796,472 | A | * | 1/1989 | Lew ................................. 73/308 |
| 4,976,146 | A | * | 12/1990 | Senghaas et al. ............... 73/313 |
| 5,070,731 | A | * | 12/1991 | Baux et al. ....................... 73/313 |
| 5,103,673 | A | * | 4/1992 | Sawada et al. ................... 73/313 |
| 5,146,785 | A | * | 9/1992 | Riley ............................... 73/313 |
| 5,253,521 | A | * | 10/1993 | Abramovich et al. .......... 73/306 |
| 5,347,864 | A | * | 9/1994 | Senghaas et al. ............... 73/313 |
| 5,627,523 | A | * | 5/1997 | Besprozvanny et al. ...... 340/623 |
| 5,723,870 | A | * | 3/1998 | Crowne et al. ................ 250/577 |
| 5,829,303 | A | * | 11/1998 | Fraser ............................. 73/319 |
| 5,848,549 | A | * | 12/1998 | Nyce et al. ..................... 73/319 |
| 5,950,487 | A | * | 9/1999 | Maresca et al. ................. 73/293 |
| 6,430,380 | B2 | * | 8/2002 | Kawakami ....................... 399/57 |
| 6,748,803 | B1 | * | 6/2004 | Durkee et al. ............. 73/290 V |
| 6,928,862 | B1 | * | 8/2005 | Robbins ....................... 73/64.55 |
| 7,066,024 | B2 | * | 6/2006 | Watchel .......................... 73/444 |
| 8,549,911 | B2 | * | 10/2013 | Rudd et al. ...................... 73/313 |
| 2006/0248952 | A1 | * | 11/2006 | Jarvie ............................. 73/444 |
| 2006/0266113 | A1 | * | 11/2006 | Hart ................................ 73/447 |
| 2007/0186648 | A1 | * | 8/2007 | Harmon et al. ................. 73/319 |
| 2009/0265132 | A1 | * | 10/2009 | Schrittenlacher et al. .... 702/137 |
| 2010/0170338 | A1 | * | 7/2010 | Prinstil et al. ................... 73/440 |

* cited by examiner

*Primary Examiner* — David A Rogers
(74) *Attorney, Agent, or Firm* — Morland C. Fischer (57) ABSTRACT

A resistive liquid level/temperature sensor and transmitter including low voltage impedance measurement circuitry to convert three impedance values into indications of the temperature and the levels of two different liquids (e.g., oil and water) located within a storage tank. A resistive chain network including a plurality of series connected resistors and a corresponding plurality of reed switches extend longitudinally through a liquid level sensing probe that is dipped into the liquids in the tank. A pair of magnetic floats having different specific gravities surround the probe and rise to the two fluid levels. The magnetic floats close adjacent reed switches which create first and second current paths through the resistive chain network. The impedances of the first and second current paths are measured to provide an indication of the liquid levels. A resistive temperature device carried by the probe provides an indication of temperature.

25 Claims, 9 Drawing Sheets

RESISTIVE LIQUID LEVEL/TEMPERATURE SENSOR AND TRANSMITTER

BACKGROUND OF THE INVENTION

1. Field of the Invention

This invention relates to a resistive liquid level/temperature sensor and transmitter including low voltage impedance measurement circuitry and a liquid level controller to convert three impedance values into indications of the temperature and the levels of two different liquids (e.g., oil and water) having two specific gravities located within an (e.g., oil) storage tank. The foregoing is accomplished, in part, by means of a resistive chain network that extends continuously within a probe that is dipped into the liquids contained by the tank.

2. Background Art

Figure 1:
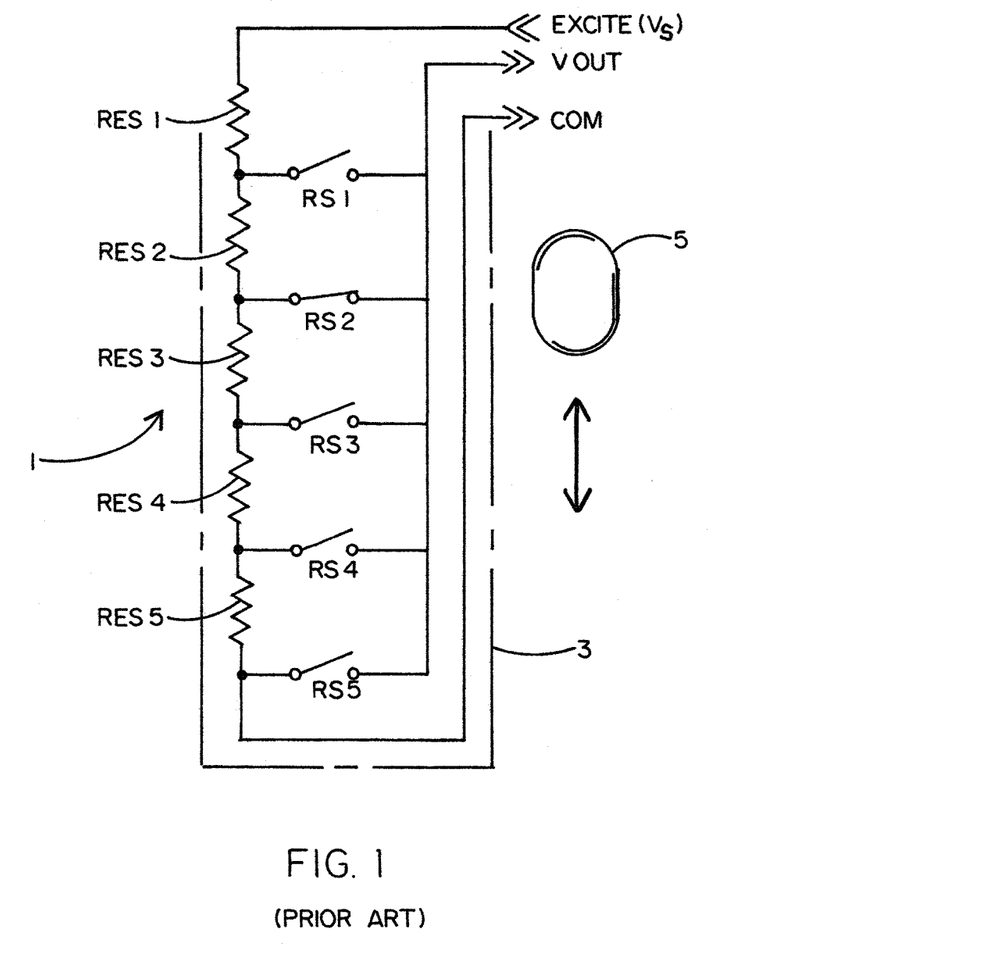
FIG. 1 shows a conventional resistive liquid level sensor for measuring the level of a single liquid.

Resistive level sensors are well known for measuring the level of a single liquid such as oil, chemical fluid, or waste water in a containment vessel, such as a tank. One such level sensor 1 is shown at FIG. 1 of the drawings. The level sensor 1 includes a resistive chain network containing an array of series connected resistors RES1 ... RES5 and a corresponding array of parallel connected, normally-open reed switches RS1 ... RS5. The number of resistors and switches shown in FIG. 1 is for the purpose of illustration, and the actual numbers will depend on the length of the level sensor. The resistive network is loaded into an elongated hollow cylindrical probe 3. A magnetic float 5 having a magnet inside surrounds the cylindrical probe 3. probe 3. The probe 3 is dipped into the liquid to be measured, and the float 5 rides up and down the outside of the probe depending upon the level of the liquid in the containment vessel. The particular location of the magnetic float 5 along the cylindrical probe 3 causes an adjacent one of the normally-open reed switches (e.g., RS2) to close and thereby complete a circuit between the network excitement voltage ($V_s$) and the network output ($V_{OUT}$) by way of the network resistors (e.g., RES1+RES2).

The resistive chain network of the resistive chain level sensor 1 of FIG. 1 functions as a voltage divider to indicate the level of the liquid into which the probe 3 is dipped. The excitement voltage $V_S$ is provided to the network and the voltage output $V_{OUT}$ is measured. However, the level sensor 1 of FIG. 1 is only capable of indicating a single liquid level by calculating the ratio of the output and excitation voltages.

Moreover, the output impedance of the resistive chain network of the level sensor 1 is very high and irregular. The maximum output impedance is one half the total impedance of all of the resistors RES1 ... RES5 and switches RS1 ... RS5. Such a high output impedance decreases accuracy, and the variant impedance introduces non-linear errors to the level calculation. The typical analog input to the level sensor 1 requires an extremely high impedance to be able to read the output voltage of the resistive chain network. What is more, the analog input cannot support a precision temperature sensor (e.g., a resistive temperature device) in cases where knowing the temperature of the liquid to be measured is important.

For some industrial applications, having access to accurate dual liquid level and temperature measurements is highly desirable. That is to say, it would be advantageous to be able to measure the levels of two different liquids lying one above the other in a single storage tank as well as the temperature at the bottom of the tank. It would also be advantageous to be able to accomplish the foregoing by means of a resistive liquid level sensor and transmitter which takes relatively low impedance measurements and consumes relatively low power when compared with the conventional resistive chain level sensor described above.

SUMMARY OF THE INVENTION

In general terms, a resistive liquid level/temperature sensor and transmitter are disclosed to measure the level of two different liquids (e.g., oil and water) which have different specific gravities and are stored in an (e.g., oil) tank. The temperature of the liquid at the bottom of the tank may also be calculated. The sensor and transmitter include a resistive liquid level temperature sensor and a liquid level controller that are interconnected with one another so that the liquid level and temperature measurements can be collected with relatively low power consumption and transmitted to a remote receiver by means of either wireless transmission or by a hard-wire transmission.

The resistive liquid level/temperature sensor and transmitter include a probe that is dipped into the liquids to be measured within the storage tank. The top of the upper liquid in the tank is referred to as the product liquid level, and the top of the lower liquid (which lies at the interface of the upper and lower liquids) is referred to as the interface liquid level. Magnetic product and interface floats having different specific gravities surround and slide up and down the probe. A continuous resistive chain network comprising a plurality of series connected resistors and a corresponding plurality of parallel connected normally-open reed switches is loaded into the probe so as to extend longitudinally therethrough. The product float rises along the probe to the product liquid level, and the interface float rises to the interface liquid level. The product and interface floats magnetically close respective ones of the normally-open reed switches from the resistive network. The resistive chain network is connected through the top of the probe to a liquid level controller. A low impedance three-wire RTD (resistive temperature device) is located near the bottom of the probe such that the resistance thereof is indicative of temperature.

As an important detail, the resistive chain network through the probe includes PRODUCT and INTERFACE impedance loops for measuring the product and interface liquid levels in the tank. Each of the PRODUCT and INTERFACE impedance loops uses different ones of the resistors from the plurality of resistors of the resistive network depending upon the product and interface liquid levels, the locations of the product and interface floats along the probe, and the corresponding pair of reed switches which have been closed by the floats. The product float will always rise along the probe so as to be positioned above the interface float. Therefore, the PRODUCT impedance loop through a first number of series connected resistors and the reed switch closed by the product float runs downwardly from the top of the resistive network in the probe. In this same regard, the INTERFACE impedance loop through a second number of series connected resistors and the reed switch closed by the interface float runs upwardly from the bottom of the resistive network. The resistances of the PRODUCT and INTERFACE impedance loops is calculated by the liquid level controller so as to provide measurements of the product and liquid levels within the storage tank.

The liquid level controller to which the resistive chain network from the probe is coupled includes a microcontroller and a low voltage (e.g., 2.7 to 3.6 VDC battery) supply. The liquid level controller has a front end analog-to-digital converter and a low impedance multiplexer that are controlled by the microcontroller. The liquid level controller is interfaced with the resistive chain network by way of the analog-to-digital converter which makes the impedance measurements. The multiplexer functions as an analog switch to selectively enable each of the PRODUCT impedance loop, the INTERFACE impedance loop, and the RTD temperature device so that the impedance measurements can be made. The liquid level controller preferably includes an ISM radio interface, or the like, to implement the wireless transmission of the liquid level and temperature data, although a hardwire transmission may also be implemented.

DESCRIPTION OF THE PREFERRED EMBODIMENT

Figure 2:
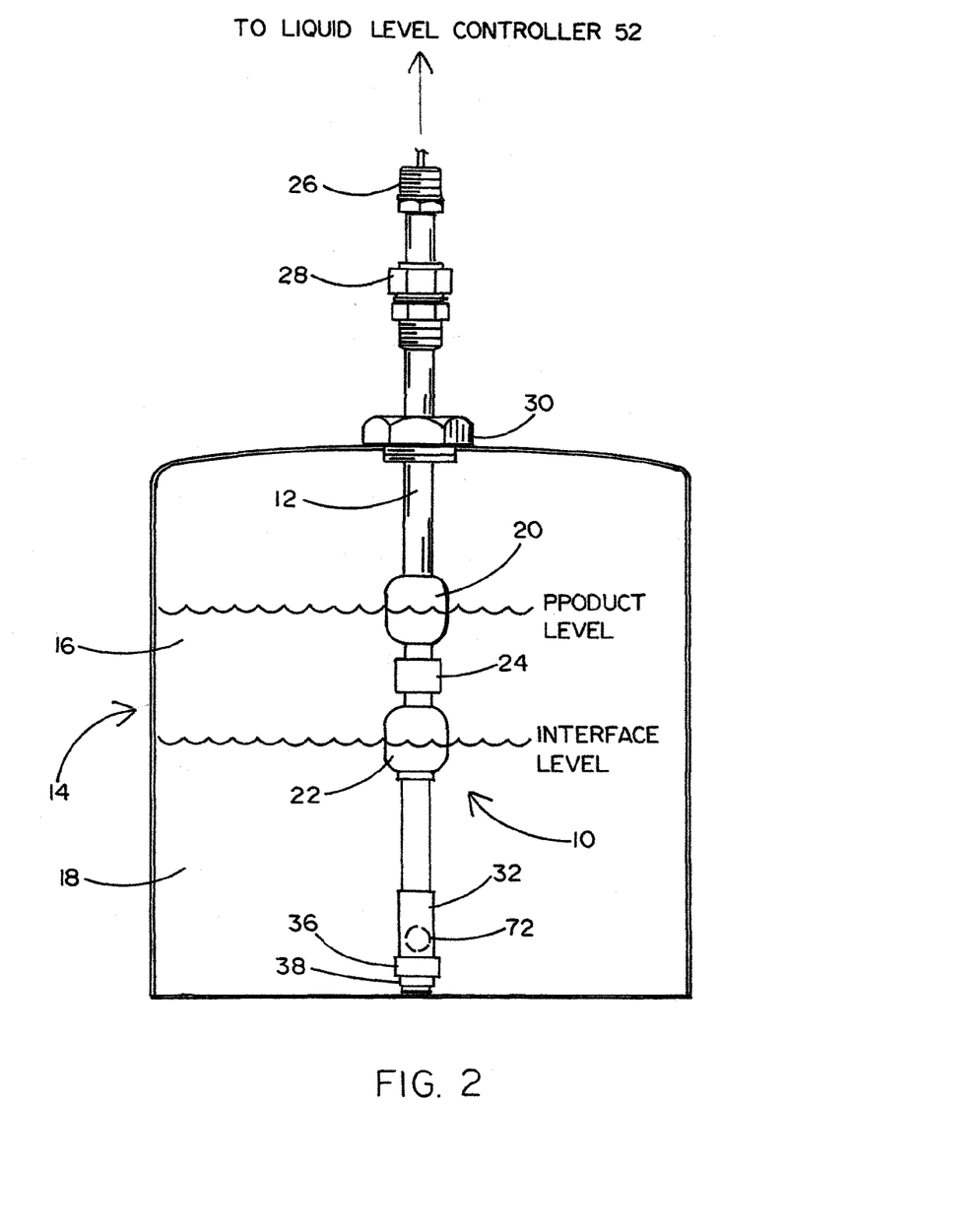
FIG. 2 is illustrative of a liquid level sensing probe from the resistive liquid level and temperature sensor of the present invention for measuring the temperature and the levels of two different liquids located one above the other in a storage tank.

FIG. 2 of the drawings illustrates a resistive liquid level sensing probe 10 that is compatible with a liquid level controller to form the resistive liquid level and temperature sensor and transmitter (designated 50 in FIG. 5) of the present invention. The probe 10 shown in FIG. 2 includes a rigid (e.g., stainless steel) cylindrical rod 12 having a length of, for example, 21 feet and a width of, for example, 5/8 inch. In the alternative, the rod 12 of probe 10 may also be manufactured from a relatively flexible material such as PVDF (polyvinylidene flouride) The rod 10 is dipped into a storage tank 14 containing two different liquids 16 and 18 having different specific gravities. In the example of FIG. 2, a volume of oil covers a volume of water within the tank 14. The top of the upper liquid 16 is designated the product level, and the top of the lower liquid 18 (which lies at the interface between the upper and lower liquids) is designated the interface level.

A magnetic product float 20 and a magnetic interface float 22, which are similar to that designated 5 in FIG. 1, surround the rod 12 of probe 10 and are adapted to slide up and down depending upon the product and interface levels of the upper and lower liquids 16 and 18. Each float 20 and 22 carries a magnet (not shown) and has a specific gravity so as to rise to one of the product or interface levels in order to correspondingly close a respective normally-open reed switch that lies on a resistive network board (best shown in FIG. 10) that runs longitudinally through the rod 12. A float spacer 24 also surrounds the rod 12 so as to separate the product and interface floats 20 and 22 from one another.

Figure 5:
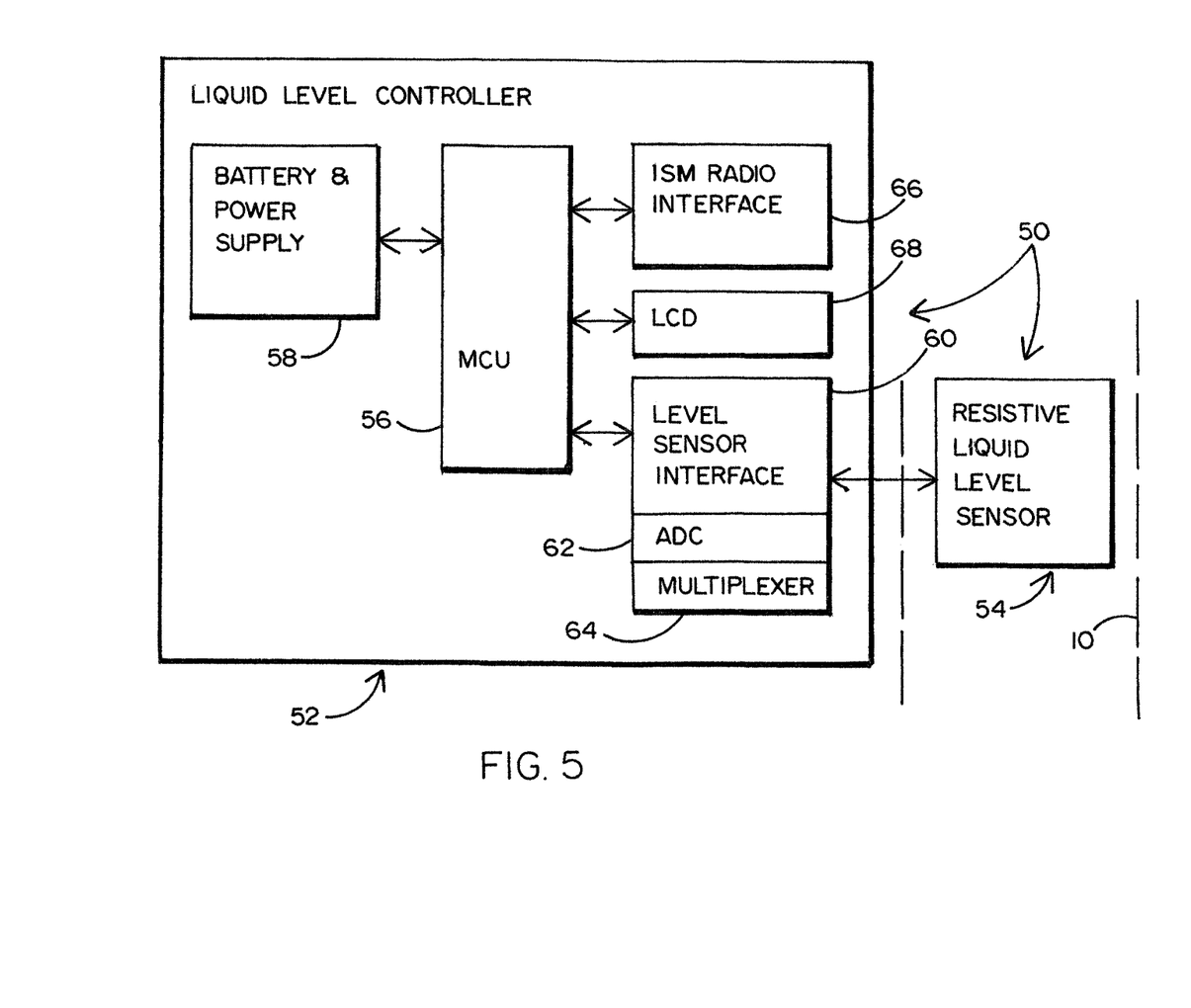
FIG. 5 is a block diagram of a liquid level controller which is interfaced with the resistive chain network shown in FIGS. 3 and 4 to form the liquid level and temperature sensor and transmitter according to a preferred embodiment of this invention.

The rod 12 of the resistive liquid level sensing probe 10 has a screw top 26 to attach to a screw-threaded connector of the liquid level controller 52 (of FIG. 5). Located below the screw top 26 is an adjustable compression fitting 28 to adjust the height of rod 12 and to attach to a reducing bushing 30. The reducing bushing 30 secures the rod 12 to the top of the storage tank 14 so that the probe 10 can measure liquid levels from the top down. A cathodic boot sleeve 32 surrounds the bottom of the rod 12 to prevent the floats 20 and 22 from sliding off the rod. A halar foot 38 anchors the bottom of the rod 12 to the bottom of the tank 14. A (e.g., stainless steel) spacer 36 surrounds the rod and lies between the sleeve and the halar foot 38.

An RTD (resistive temperature device) sensor 72 (best shown in FIG. 7) is located near the bottom of the rod 12 of probe 10. The resistance of RTD sensor 72 varies with temperature.

Figure 3:
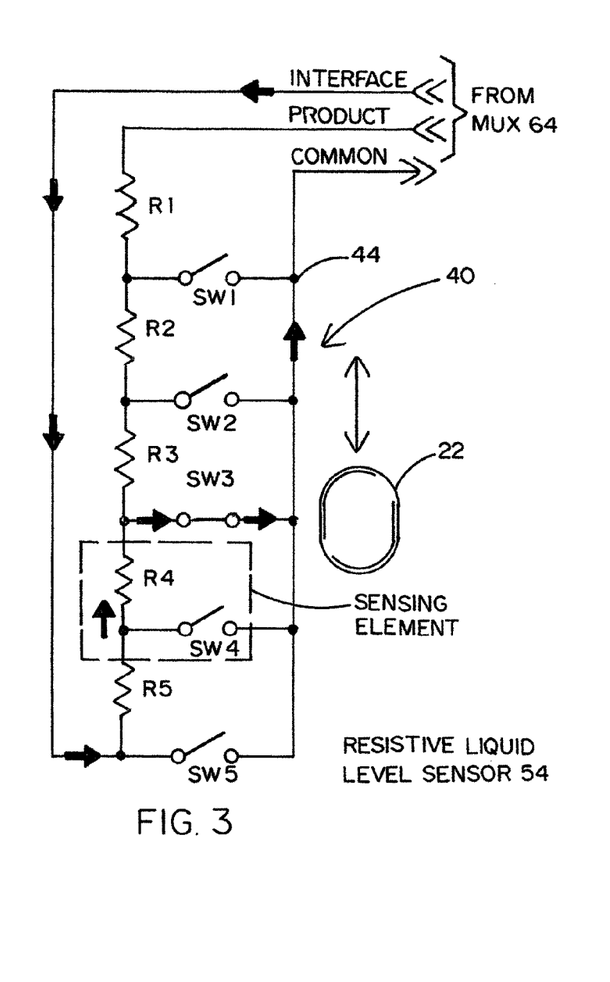
FIG. 3 is a schematic representation of a resistive chain network carried by the liquid level sensing probe of FIG. 2 and having an INTERFACE impedance loop for measuring the level of the lower-most of the two different liquids.
Figure 4:
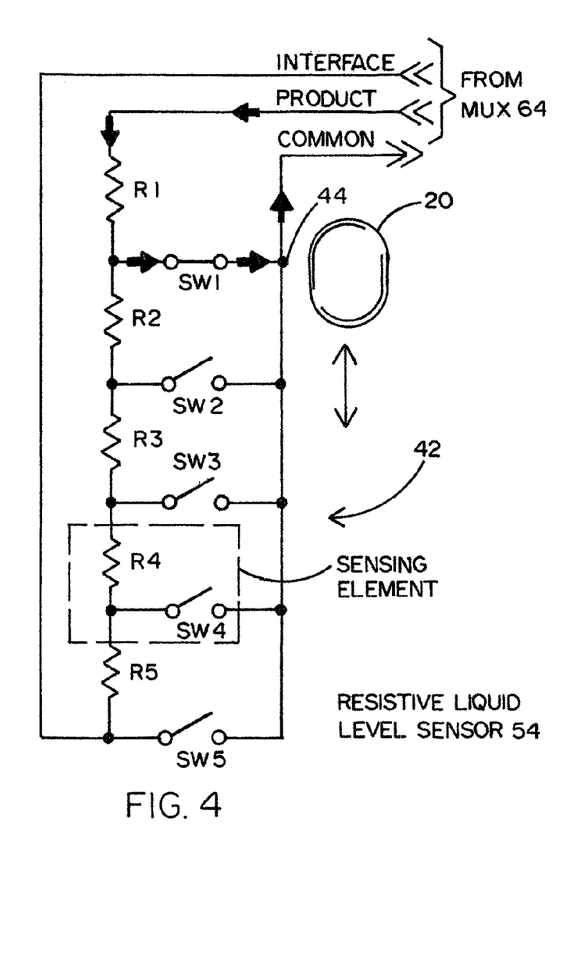
FIG. 4 is a schematic representation of the resistive chain network of FIG. 3 having a PRODUCT impedance loop for measuring the level of the upper-most liquid.

Details are now provided of the resistive liquid level/temperature sensor and transmitter (designated 50 in FIG. 5) of this invention that is capable of both measuring and transmitting an accurate indication of first and second (product and interface) liquid levels and the temperature within a storage tank, such as that designated 14 in FIG. 2. The sensor and transmitter 50 include a resistive liquid level sensor (designated 54 in FIGS. 3-5) and the aforementioned liquid level controller 52 of FIG. 5. As shown in FIGS. 3 and 4, the resistive liquid level sensor 54 has an array of sensing elements arranged in a chain resistor network. Each sensing element includes one normally-open reed switch and a (e.g., 20 ohm) resistor. The sensing elements of the array are preferably spaced at 0.25 inch or 0.5 inch apart from one another. In this manner, the liquid level sensor 54 can provide quarter or half inch resolution of liquid levels.

The resistive liquid level sensor 54 of the resistive liquid level/temperature sensor and transmitter 50 is loaded into the probe (designated 10 in FIG. 2) so as to be surrounded by the cylindrical rod 12 thereof and dipped into the liquid contents of the tank 14. Three impedance loops are provided for measuring the product liquid level, the interface liquid level and the temperature within the tank. As will be explained hereinafter while referring to FIG. 5, the resistive liquid level sensor 54 is interconnected to the liquid level controller 52 so that liquid level and temperature measurement information can be communicated to the controller.

Turning to FIGS. 3 and 4 of the drawings, the impedance loops 40 and 42 of the liquid level sensor 54 are now briefly explained for measuring the interface and product liquid levels within the tank 14 shown in FIG. 2. Each of the impedance loops 40 and 42 is coupled to the liquid level controller 52 (of FIG. 5) and selectively enabled by a low impedance analog multiplexer (MUX) 64 thereof. As previously described, the liquid level sensor 54 (i.e., the chain resistor network) includes an array of sensing elements, wherein each sensing element has one of a plurality of series connected resistors R1 . . . R5 and one of a corresponding plurality of parallel connected normally-open reed switches SW1 . . . SW5. The impedance loops 40 and 42 have a total of three loop current input and output lines. More particularly, a current input line (designated INTERFACE in FIGS. 3 and 4) extends from the multiplexer 64 of the liquid level controller 52 to the last (i.e., bottom-most) resistor R5 of the series connected resistors R1 . . . R5. Another current input line (designated PRODUCT in FIGS. 3 and 4) extends from the multiplexer 64 of liquid level controller 52 to the first (i.e., top-most) resistor R1 of the series connected resistors R1 . . . R5. A current output line (designated COMMON in FIGS. 3 and 4) extends from a common electrical junction 44 of the parallel connected reed switches SW1 . . . SW5 to ground.

Referring specifically to FIG. 3, the interface impedance loop 40 of the resistive liquid level sensor 54 is described for measuring the interface level of the liquid at the bottom of the tank. In this case, a loop current travels along the INTERFACE input line, first to the bottom of the resistive liquid level sensor 54, and then upwardly towards the series connected resistors R1 . . . R5. The magnetic interface float 22 (of FIG. 2) which is positioned at the interface between the liquids 16 and 18 in the tank is always located below the product float 20 (also of FIG. 2). The magnetic interface float 22 has a higher specific gravity value than the product float 20 so as to be ideal for measuring the level of water within an oil storage tank. The normally-open reed switch SW3 which lies in proximity to the interface float 22 is closed, and an interface loop current path is created to ground by way of the resistors R5+R4 located below the interface float 22, the closed reed switch SW3, and the COMMON output line.

Referring now to FIG. 4, the product impedance loop 42 of the resistive liquid level sensor 54 is described for measuring the product level of the liquid at the top of the tank. In this case, a loop current travels along the PRODUCT input line downwardly towards the resistors R1 . . . R5 to close the normally-open reed switch SW1 which lies in proximity to the magnetic product float 20. The product float 20 has a lower specific gravity value than that of the interface float 22 so as to rise to the top of the liquids in the tank and be ideal for measuring the level of oil. Accordingly, a product loop current path is created to ground by way of the resistor R1 located above the product float 20, the closed reed switch SW1, and the COMMON output line.

FIG. 5 of the drawings shows a block diagram of the liquid level controller 52 of the resistive liquid level/temperature sensor and transmitter 50 to which the resistive liquid level sensor 54 of FIGS. 3 and 4 is coupled. The controller 52 includes an ultra low power microcontroller 64 (MCU) such as, for example, Part No. MSP430F5528 manufactured by Texas Instruments. The microcontroller 64 is powered by a relatively low voltage (e.g., 2.7 to 3.6 volt DC lithium battery) supply 58. The resistive liquid level sensor 54 communicates with the microcontroller 56 of the liquid level controller 52 by way of an interface 60. The interface 60 of the controller 52 contains an analog-to-digital converter (ADC) 62 and the aforementioned analog multiplexer (MUX) 64 which functions as an analog switch to selectively enable three different impedance loops from which measurements are made that are representative of the interface liquid level, the product liquid level and the temperature within the storage tank. By way of example, the analog-to-digital converter 62 of the interface 60 which makes the low impedance measurements along the three impedance loops is a 24-bit ADC Linear Part No. LTC 2492IDE, and the multiplexer switch 64 which selects a particular impedance loop for measurement is an Exar Part No. MAX 4734.

The liquid level controller 52 also includes an ISM radio interface which provides an RF link to a WIO gateway and remote receiver. Thus, the liquid level controller 52 shown in FIG. 5 is adapted to transmit liquid level and temperature data over a wireless transmission path. However, the controller 52 may also transmit data over a hard-wired transmission path (not shown) in which case the radio interface 66 may be eliminated. In this case, the controller 52 may include a 4-20 mA serial data interface that is suitable for hardwire transmission. To permit user interface, the controller 52 is provided with a conventional liquid crystal display (LCD) such as, for example, Electronic Assembly Part No. DOGM162.

Figure 6:
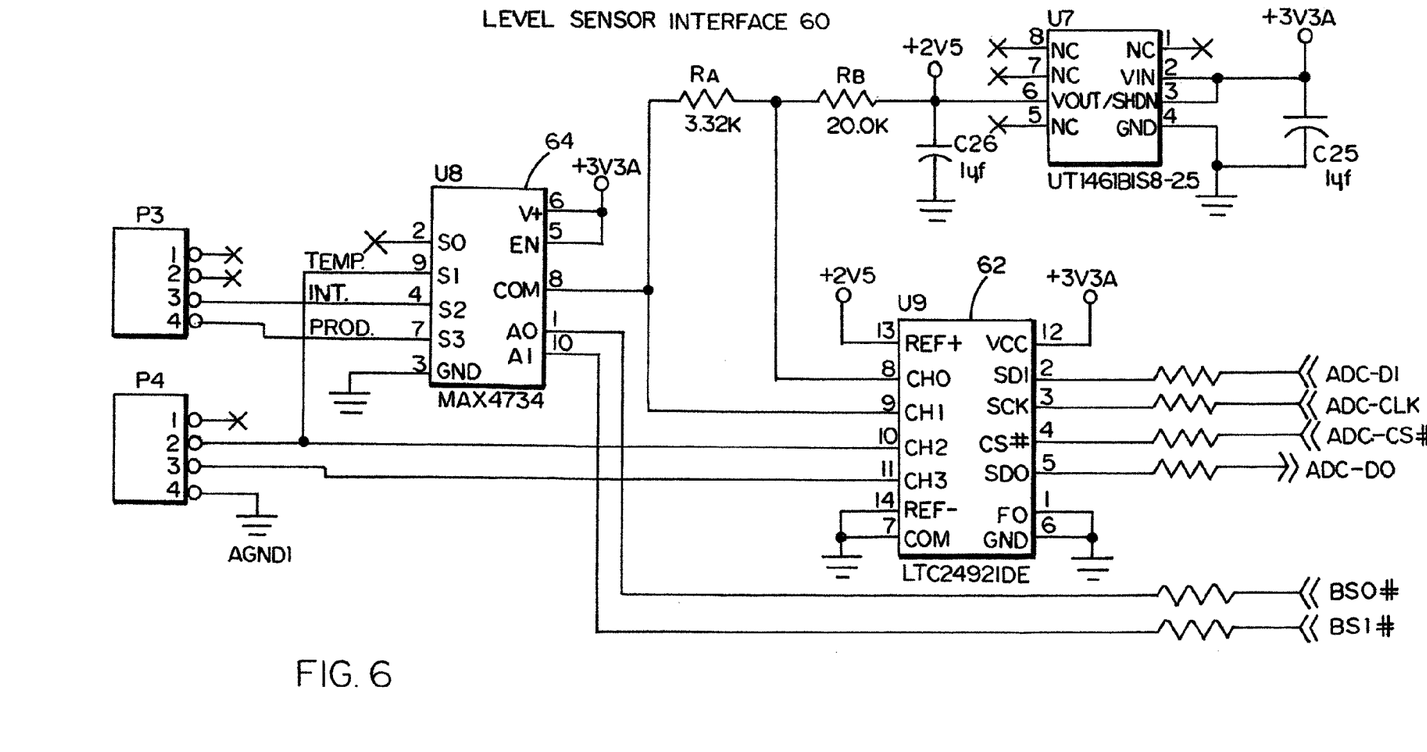
FIG. 6 is a schematic circuit of an analog interface between the resistive chain network shown in FIGS. 3 and 4 and the liquid level controller shown in FIG. 5.

FIG. 6 of the drawings is a schematic of the analog front end circuitry of the level sensor interface 60 of the liquid level controller 52 of FIG. 5 by which controller 52 is coupled to the resistive liquid level sensor 54 to complete the resistive liquid level/temperature sensor and transmitter 50. In particular, the interconnection of the analog-to-digital converter 62 and multiplexer 64 is shown so that the three impedance loops can be enabled and the impedance thereof measured and converted to product and interface liquid levels.

Figure 7:
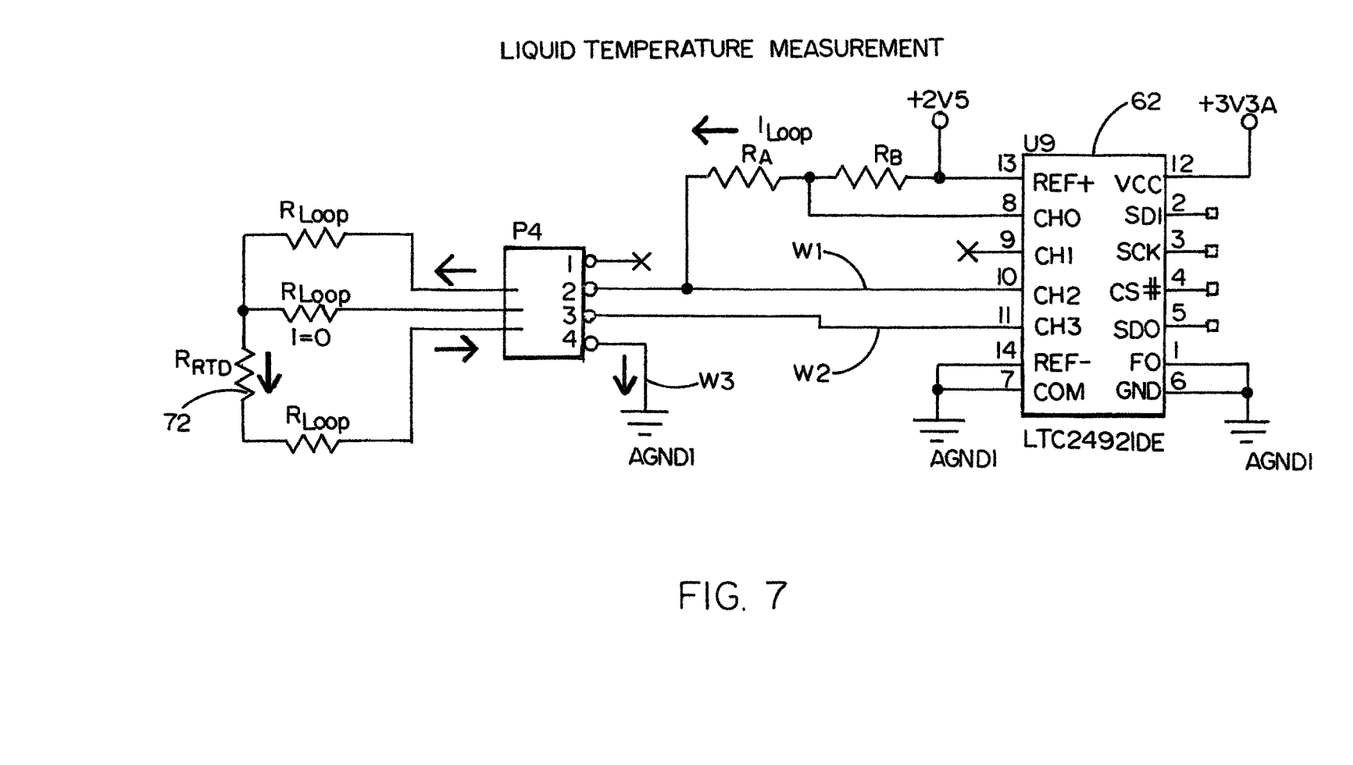
FIG. 7 is a schematic circuit to illustrate the interconnection of the analog interface of FIG. 6 with an impedance loop having a 3-wire resistive temperature device for measuring the temperature of the liquid at the bottom of the liquid level sensing probe of FIG. 2.

Referring to FIGS. 6 and 7 of the drawings, a description is provided for making a measurement of temperature at the bottom of the oil storage tank (e.g., 14 of FIG. 2). FIG. 7 is a simplified schematic which shows the analog-to-digital converter (ADC) 62 of FIG. 6 and a loop impedance path from ADC 62 to ground. In this case, an indication of temperature is provided by means of a 3-wire low impedance resistive temperature device (RTD) 72. By way of example, the RTD 72 is a PT-100 resistive device whose resistance, which varies with temperature, lies in a range of 18 ohms to 390 ohms and whose loop impedance is defined by the three wires W1, W2 and W3 shown in FIG. 7 and measured by ADC 62. As previously indicated while referring to FIG. 2, the RTD 72 is located near the bottom of the rod 12 of the liquid level sensing probe 10. In order to eliminate the impedance of the multiplexer 64, channel 2 of the ADC 62 is used to measure the impedance of the RTD loop. The RTD loop is enabled by setting BS0# and BS#1 of multiplexer 64 to logic levels 1 and 0, respectively.

Figure 8:
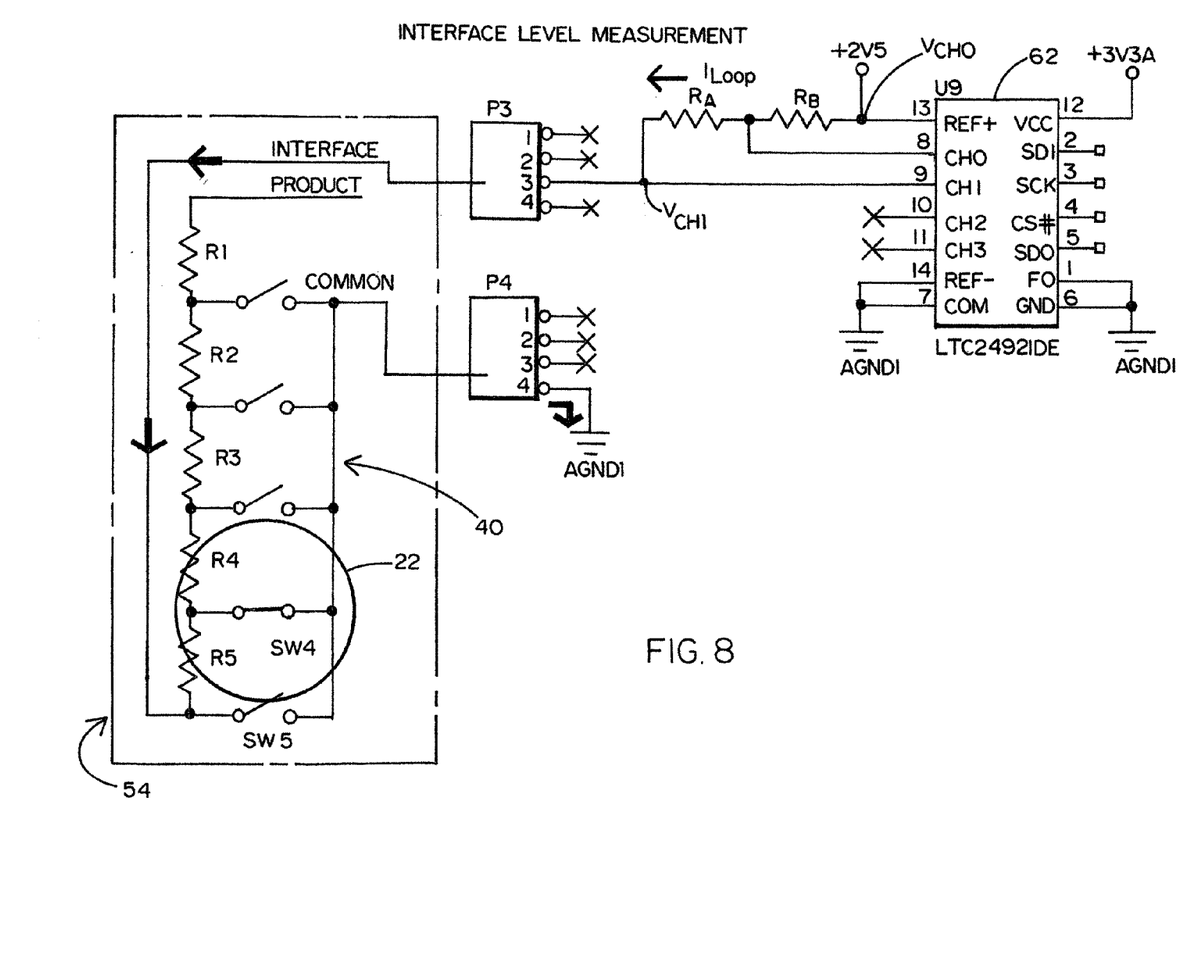
FIG. 8 is a schematic circuit to illustrate the interconnection of the analog interface of FIG. 6 with the INTERFACE impedance loop of FIG. 3.

Referring to FIGS. 6 and 8 of the drawings, a description is provided for making an interface liquid level measurement within the tank (14 of FIG. 2). FIG. 8 is a simplified schematic which shows the analog-to-digital converter (ADC) 62 of FIG. 6 and the current path ($I_{LOOP}$) through the INTERFACE current line of the interface impedance loop 40 of the resistive liquid level sensor 54. The interface impedance loop runs from ADC 62, through the resistive liquid level sensor 54, and to ground by which the interface liquid level is calculated. As was previously described while referring to FIG. 3, the magnetic interface float 22 (which always lies below the magnetic produce float 20 at the interface of the two fluids to be measured) closes an adjacent normally-open reed switch SW4 from a particular one of the sensing elements of the chain of sensing elements which forms the resistive liquid level sensor 54.

The interface liquid level is measured by using two channels (CH0 and CH1) of the ADC 62 and by converting resistance into an indication of height. That is, the interface liquid level is calculated by measuring the resistance of the interface impedance loop 40 which is enabled by setting BS1# and BS0# (channel 2 of the analog multiplexer 64 of FIG. 6) to logic levels 1 and 0, respectively. The analog input to the interface impedance loop 40 from ADC 62 includes a reference resistor $R_A$ and a series connected current limiting resistor $R_B$. The voltage $V_{CH0}$ on the first channel CH0 of ADC 62 is measured between the series connected resistors $R_A$ and $R_B$. The voltage $V_{CH1}$ on the second channel CH1 of ADC 62 is measured after the series connected resistors $R_A$ and $R_B$.

Figure 10:
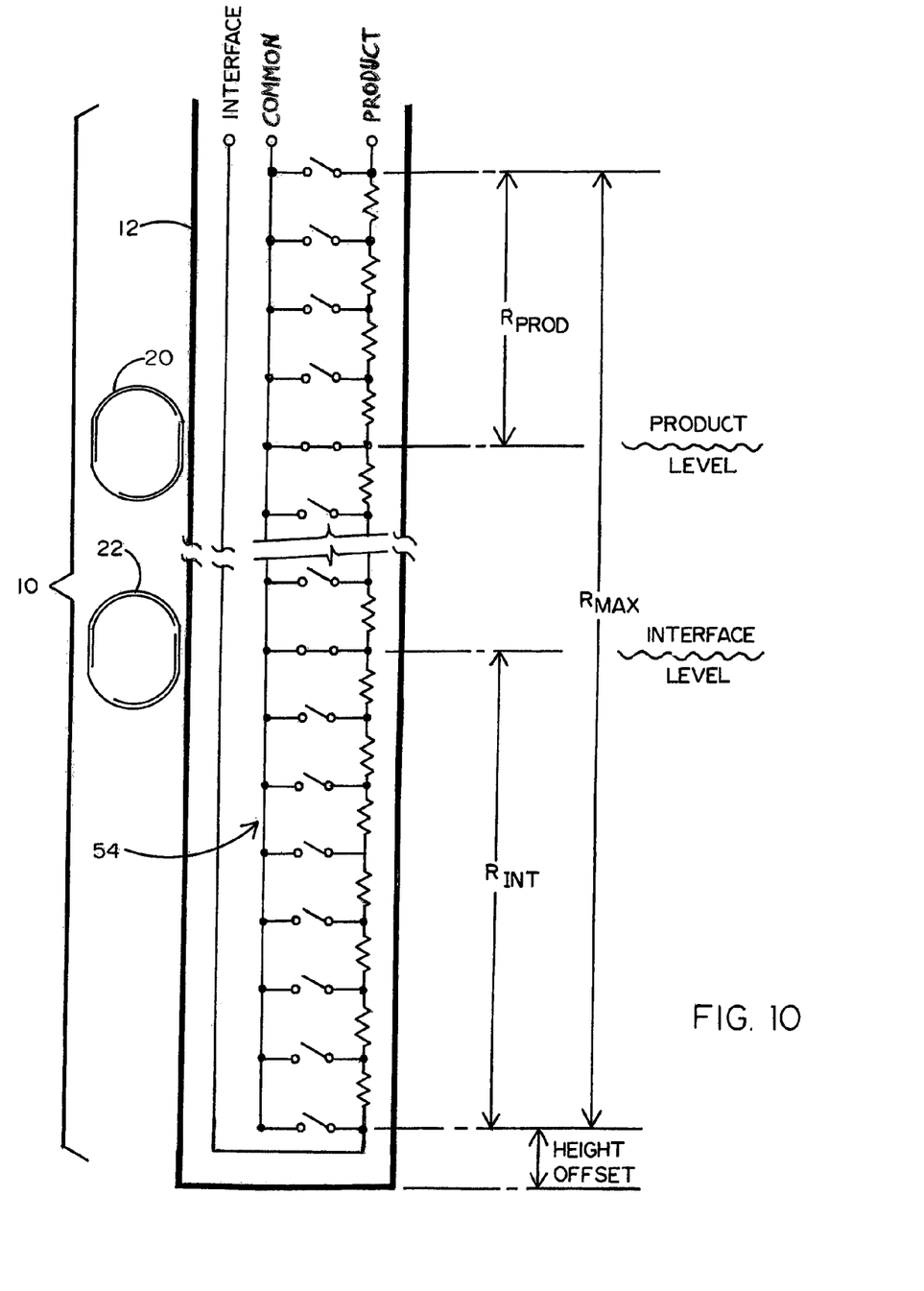
FIG. 10 represents the resistive chain network of FIGS. 3 and 4 extending longitudinally through the liquid level sensing probe of FIG. 2.

As was earlier explained, the resistance of the interface impedance loop 40 (with respect to the location of the interface float 22) along the INTERFACE current path increases from the bottom of the loop towards the top. The interface liquid level (designated Height$_{INTF}$) is calculated by the microcontroller 56 of the liquid level controller 52 of FIG. 5, as follows:

$$R_{INTF} = R_A \times V_{CH1}/(V_{CH0} - V_{CH1}), \text{ and}$$

$$\text{Height}_{INTF} = Sp \times (R_{INTF}/R_{SW}) + \text{Height Offset},$$

where Height Offset (shown in FIG. 10) is the distance between the bottom of the tank 14 to the bottom-most reed switch SW5 in the resistance chain of the interface impedance loop 40, $R_{SW}$ is the average resistance of a reed switch from the loop, and Sp is the resolution of the probe (designated 10 in FIG. 2) which, in the present example, is either 0.25 inch or 0.50 inch, depending upon the spacing of the reed switches SW1 . . . SW5 from one another.

Figure 9:
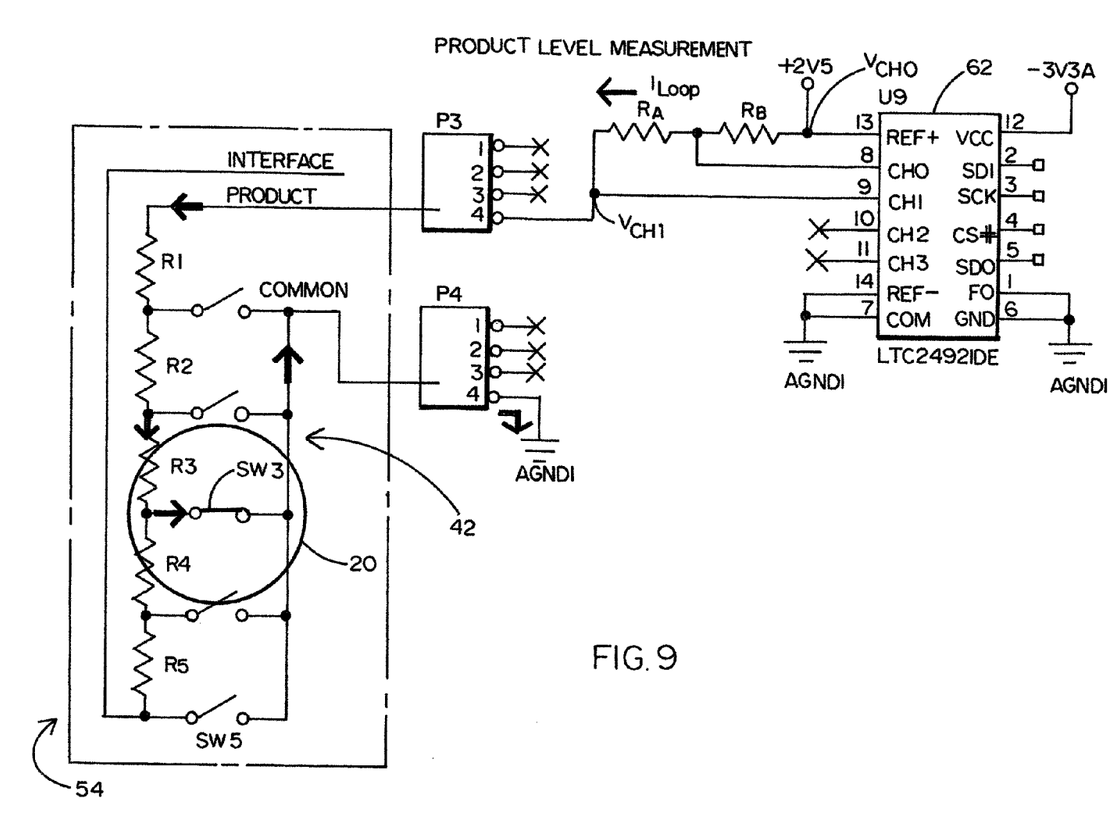
FIG. 9 is a schematic circuit to illustrate the interconnection of the analog interface of FIG. 6 with the PRODUCT impedance loop of FIG. 4.

Referring to FIGS. 6 and 9 of the drawings, a description is provided for making a product liquid level measurement within the tank (14 of FIG. 2). FIG. 9 is a simplified schematic which shows the ADC 62 of FIG. 6 and the current path ($I_{LOOP}$) through the PRODUCT current line of the product impedance loop 42 of the resistive liquid level sensor 54. The product impedance loop runs from ADC 62, through the resistive liquid level sensor 54, and to ground by which the product liquid level is calculated. As was previously described while referring to FIG. 4, the magnetic product float 20 (which always lies above the magnetic interface float 22 at the top of the two fluids to be measured) closes an adjacent normally-open reed switch SW3 from a different one of the sensing elements of the chain of sensing elements which forms the resistive liquid level sensor 54.

Like the interface liquid level described when referring to FIG. 8, the product liquid level of FIG. 9 is measured by using the two channels CH0 and CH1 of the ADC 62. In this case, however, the product liquid level is calculated by measuring the resistance of the product impedance loop 42 which is enabled by setting BS1# and BS0# (channel 3 of the analog multiplexer 64 of FIG. 6) to logic levels 1 and 1, respectively. The voltages $V_{CH0}$ and $V_{CH1}$ for computing the product liquid level are measured from the same points as those described in FIG. 8 for measuring the interface liquid level.

As was also earlier explained, the resistance of the product impedance loop 40 (with respect to the location of the product float 20) along the PRODUCT current path increases from the top of the loop towards the bottom. The product liquid level (designated Height$_{PROD}$) is calculated by the microcontroller 56 of the liquid level controller 52 of FIG. 5, as follows:

$$R_{PROD} = R_A \times V_{CH1}/(V_{CH0} - V_{CH1}), \text{ and}$$

$$\text{Height}_{PROD} = Sp \times (R_{MAX} - R_{PROD}/R_{SW}) + \text{Height Offset},$$

where the values of Height Offset, $R_{SW}$ and Sp are the same as those described above for calculating the interface liquid level, and $R_{MAX}$ (illustrated in FIG. 10) is the maximum resistance of the series connected resistors (i.e., $R_1 + R_2 + \ldots + R_5$) that are carried by a sensing probe 10 (of FIG. 2) having a rod 12 of a fixed, known length.

FIG. 10 of the drawings illustrates the resistive chain network of the resistive liquid level sensor 54 shown in FIGS. 3 and 4 of the drawings to be mounted on a circuit board (not shown) and extending longitudinally and completely through the rod 12 of the resistive liquid level sensing probe 10 of FIG. 2. The total number of resistors, the total resistance thereof $R_{MAX}$, and the corresponding number of normally-open reed switches which form the resistive liquid level sensor 54 are dependent upon the length of the probe 10 and the resolution of the sensor 54 (i.e., the spacing between the resistors). As was explained when referring to FIGS. 3 and 4 and as is shown in FIG. 10, the interface liquid level is calculated by using the sum of the resistances of a first number of series connected resistors (designated $R_{INT}$) measured upwardly from the bottom of the level sensor 54. The product liquid level is calculated by using the sum of the resistances of a second number of series connected resistors (designated $R_{PROD}$) measured downwardly from the top of the level sensor 54. The first and second numbers of resistors is determined by the locations of the product and interface probes 20 and 22 along the probe 10.

It may be appreciated that the resistive liquid level/temperature sensor and transmitter 50 of this invention includes low voltage impedance measurement circuitry and a liquid level controller 52 (of FIG. 5) having a microcontroller 56 to convert three loop impedance values (illustrated in FIGS. 7, 8 and 9) into indications of liquid temperature, interface liquid level and product liquid level from a tank containing two different liquids having different specific gravities. In particular, a low impedance analog multiplexer 64 of the controller 52 designates three distinct current paths through a 3-wire resistance temperature device 72, an INTERFACE resistive loop, and a PRODUCT resistive loop. The sensor and transmitter 50 is capable of operating with a low voltage battery power supply so as to advantageously consume less power than conventional resistive liquid level measuring systems.

The invention claimed is:

1. A method for measuring the levels of first and second liquids in a container wherein the first liquid lies below the second liquid, said method comprising the steps of:
   locating a plurality of resistors that are interconnected to one another in electrical series inside a probe such that said resistors extend longitudinally through said probe;
   dipping the probe into the liquids to be measured so that said plurality of series connected resistors extends from at least the top of the second liquid to the bottom of the first liquid;
   creating a first current path through a first number of said plurality of series connected resistors which lie between the bottom of the container and the interface of the first and second liquids;
   creating a second current path through a second number of said plurality of series connected resistors which lie between the top of the container and the top of the second liquid;
   measuring the total resistance of said first number of said plurality of resistors within said first current path; and
   measuring the total resistance of said second number of said plurality of resistors within said second current path.

2. The method recited in claim 1, wherein said plurality of series connected resistors has a first end lying adjacent the bottom of the probe and an opposite end lying adjacent the top of the probe, said method comprising the additional step of creating said first and second current paths between the first and opposite ends of said plurality of series connected resistors and running upwardly relative to said probe through said first and second numbers of said series connected resistors.

3. The method recited in claim 2, comprising the additional step of interconnecting said plurality of series connected resistors extending longitudinally through the probe to a liquid level controller including a multiplexer and an analog-to-digital converter, said multiplexer adapted to selectively enable said first and second current paths through said first and second numbers of series connected resistors.

4. The method recited in claim 3, wherein the analog-to-digital converter of said liquid level controller is responsive to the total resistance of each of said first and second numbers of series connected resistors when said first and second current paths are enabled for providing indications of the heights of the first and second fluids within the container.

5. The method recited in claim 4, wherein said liquid level controller also includes a radio interface, said method comprising the additional step of transmitting the indications of the heights of the first and second fluids within the container from said radio interface to a location that is remote from the container by way of a wireless communication path.

6. The method recited in claim 5, wherein said liquid level controller also includes a microcontroller for controlling said multiplexer, said analog-to-digital converter, and said radio interface, said method comprising the additional step of powering said microcontroller by a low voltage battery supply lying in a range of voltages between 2.7 to 3.6 volts DC.

7. The method recited in claim 1, comprising the additional steps of connecting a plurality of normally-open switches to respective ones of said plurality of series connected resistors, closing a first of said plurality of normally-open switches to complete said first current path through the first number of series connected resistors, and closing a second one of said plurality of normally-open switches to complete said second current path through the second number of series connected resistors.

8. The method recited in claim 7, wherein each of said plurality of normally-open switches is responsive to a magnetic force located in proximity thereto, said method comprising the additional steps of positioning a first magnetic force generator in proximity to said first normally-open switch for closing said first switch and thereby completing said first current path, and positioning a second magnetic force generator in proximity to said second normally-open switch for closing said second switch and thereby completing said second current path.

9. The method recited in claim 8, wherein said first magnetic force generator is a first magnetic float having a first specific gravity corresponding to the specific gravity of the first liquid in the container, and the second magnetic force generator is a second magnetic float having a second specific gravity corresponding to the specific gravity of the second liquid in the container, said method comprising the additional steps of coupling said first and second magnetic floats to said probe so that said floats rise to the respective levels of the first and second liquids in the container, and separating said first and second magnetic floats from one another such that said second float always lies above said first float.

10. The method recited in claim 9, comprising the additional step of coupling said first and second magnetic floats to said probe such that said floats surround said probe and move upwardly therealong to the respective levels of the first and second liquids in the container.

11. A method for measuring the levels of first and second liquids in a container wherein the second liquid lies above the first liquid, said method comprising the steps of:
connecting a plurality of resistors in electrical series;
connecting a plurality of magnetic force-responsive normally-open switches to respective ones of said plurality of resistors;
locating said pluralities of series connected resistors and normally-open switches inside a probe so as to extend longitudinally therethrough, such that a first end of said series connected resistors lies adjacent the bottom of the probe and the opposite end of said series connected resistors lies adjacent the top of said probe;
dipping said probe into the liquids to be measured;
coupling first and second magnetic force generators to said probe such that said first magnetic force generator has a first specific gravity corresponding to the specific gravity of the first liquid and the second magnetic force generator has a second specific gravity corresponding to the specific gravity of the second liquid whereby said first and second magnetic force generators rise to the levels of the first and second liquids in the container so as to close respective first and second ones of said plurality of magnetic force-responsive normally-open switches lying in proximity to said force generators and thereby create a first current path starting from the first end of said plurality of series connected resistors and running upwardly relative to said probe through said first switch and a first number of said plurality of series connected resistors corresponding to the height of the first liquid and a second current path starting from the opposite end of said plurality of series connected resistors and running downwardly relative to said probe through said second switch and a second number of said plurality of series connected resistors corresponding to the height of the second liquid lying above the first liquid; and
measuring the total resistance of each of said first and second current paths created when said first and second magnetic force-responsive switches are closed.

12. The method recited in claim 11, wherein said first magnetic force generator is a first magnetic float surrounding said probe and being slidable therealong to the level of the first liquid to be measured, and said second magnetic force generator is a second magnetic float surrounding said probe and being slidable therealong to the level of the second liquid to be measured.

13. The method recited in claim 12, comprising the additional step of separating said first and second magnetic floats from one another such that said second float always lies above said first float.

14. The method recited in claim 11, including a multiplexer for selecting one or the other of said first or second current paths for measuring the total resistance thereof and thereby indicating the heights of the first and second liquids in the container.

15. The method recited in claim 11, comprising the additional step of locating a temperature sensor inside the probe to provide an indication of the temperature of the first or second liquid in the container depending upon the location of the temperature sensor.

16. The method recited in claim 15, wherein said temperature sensor is a three-wire resistive temperature device, the resistance of which varies with temperature, said method comprising the additional step of determining the resistance of said resistive temperature device by means of an analog-to-digital converter coupled to said device.

17. The method recited in claim 11, wherein said probe is manufactured from a flexible material.

18. A liquid level sensor for indicating the levels of first and second liquids in a container, wherein the second liquid lies above the first liquid, said sensor comprising:
a liquid probe;
a plurality of magnetic force-responsive normally-open switches connected to respective ones of a plurality of resistors which are connected in electrical series to form a resistor chain network having first and opposite ends, said pluralities of series connected resistors and normally-open switches being located inside said probe and extending longitudinally therethrough;

a first magnetic float having a first specific gravity surrounding the probe and sliding therealong to the first liquid level when said probe is dipped into the first and second liquids in the container; and a second magnetic float having a second specific gravity surrounding the probe, said second magnetic float lying above said first magnetic float and sliding along said probe to the second liquid level when said probe is dipped into the first and second liquids in the container, said first and second magnetic floats closing respective first and second ones of said plurality of magnetic force-responsive normally-open switches lying in proximity to said first and second magnetic floats to thereby create a first current path extending from a voltage supply to the first end of said series connected resistor chain network and running through said first magnetic force-responsive switch and a first number of said plurality of series connected resistors corresponding to the height of the first liquid and a second current path extending from said voltage supply to the opposite end of said series connected resistor chain network and running through said second magnetic force-responsive switch and a second number of said plurality of series connected resistors corresponding to the height of the second liquid above the first liquid, wherein the total resistance of each of said first and second current paths being indicative of the levels of the first and second liquids in the container.

19. The liquid level sensor recited in claim 18, wherein each of said first and second current paths is connected from said voltage source to electrical ground by way of a common output line.

20. The liquid level sensor recited in claim 18, further comprising a multiplexer to selectively connect one or the other of said first and second current paths to the voltage source for supplying current thereto and through one or the other of said first and second numbers of series connected resistors of said resistor chain network.

21. The liquid level sensor recited in claim 20, further comprising an analog-to-digital converter coupled to said resistor chain network and responsive to the total resistance of each of said first and second current paths for providing indications of the levels of the first and second liquids in the container.

22. The liquid level sensor recited in claim 21, further comprising a radio interface communicating with said analog-to-digital converter to transmit the indications of the levels of the first and second liquids in the container depending upon the total resistance of each of said first and second current paths.

23. The liquid level sensor recited in claim 22, further comprising a battery-powered microcontroller to control said multiplexer, said analog-to-digital converter and said radio interface.

24. The liquid level sensor recited in claim 18, further comprising a resistive temperature sensor to provide an indication of the temperature of the first and second liquids in the container depending upon the resistance of said temperature sensor and the location of said temperature sensor with respect to said liquid probe, and an analog-to-digital converter coupled to said resistive temperature sensor and responsive to the resistance thereof.

25. The liquid level sensor recited in claim 18, wherein said liquid probe is manufactured from a flexible material.

\* \* \* \* \*